Feb. 14, 1961 R. H. WHITTLE ET AL 2,971,585
SEQUENCING AND PRESSURE REDUCING VALVE UTILIZING V-SHAPED
ORIFICE TO EFFECT PRESSURE AND GAIN REGULATION
Filed July 29, 1957 3 Sheets-Sheet 2
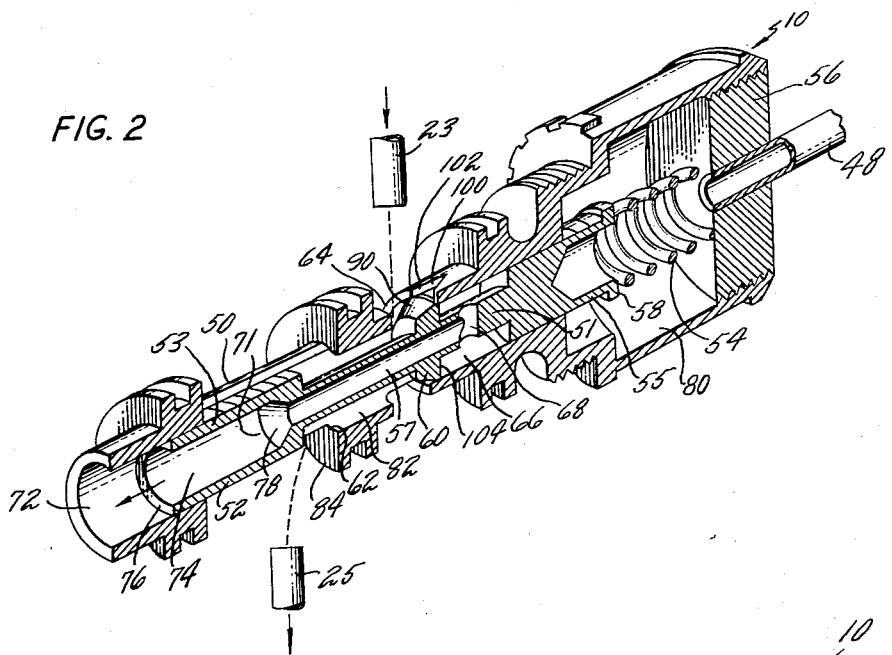
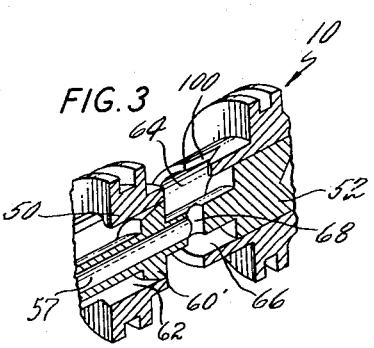
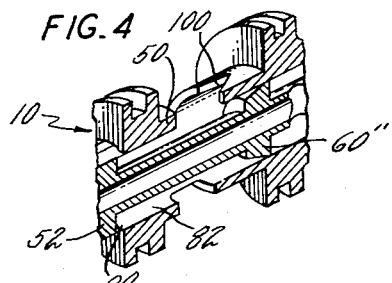
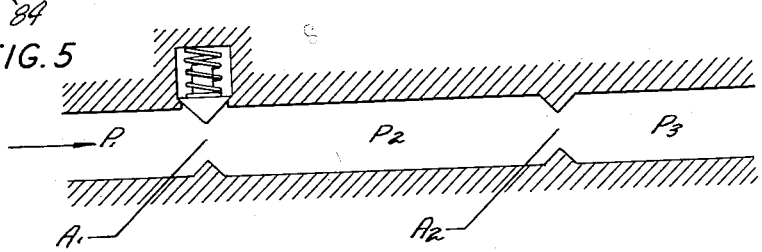
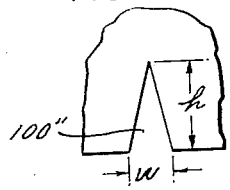
INVENTORS
RICHARD H. WHITTLE
JOSEPH R. BARRASSO
BY Vernon F. Hauschild
ATTORNEY United States Patent Office 2,971,585
Patented Feb. 14, 1961

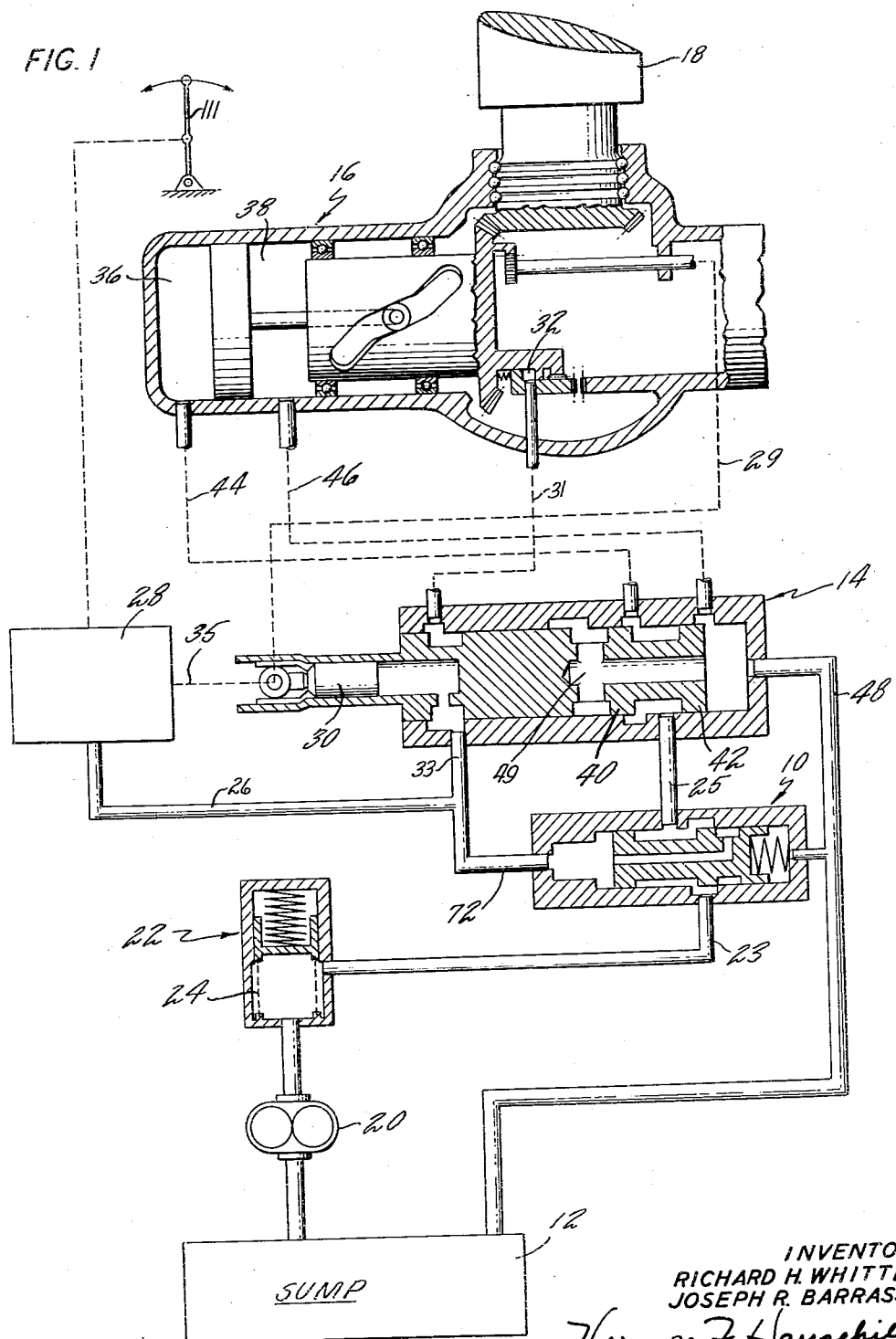

2,971,585
SEQUENCING AND PRESSURE REDUCING VALVE UTILIZING V-SHAPED ORIFICE TO EFFECT PRESSURE AND GAIN REGULATION

Richard H. Whittle, Unionville, and Joseph R. Barrasso, Hebron, Conn., assignors to United Aircraft Corporation, East Hartford, Conn., a corporation of Delaware Filed July 29, 1957, Ser. No. 674,864

9 Claims. (Cl. 170—160.32)

This invention relates to valves and more particularly to valves of the type which perform the functions of sequencing and pressure and gain regulation, especially in hydraulically operated, variable pitch aircraft propeller units.

It is an object of this invention to teach a valve construction which performs a sequencing function to insure that hydraulic fluid is provided to particular parts of a power plant, such as the control for an aircraft propeller, before it is provided to other parts of the power plant, such as the pitch change motor of an aircraft propeller.

It is a further object of this invention to teach a sequencing valve which also performs pressure reducing and pressure regulating functions.

It is a most important object of this invention to teach a valve for use with fluids which performs a sequencing, pressure reducing and pressure regulating function and which, in conjunction with its pressure regulating function, controls a regulated fluid pressure to provide constant gain over wide ranges of fluid supply pressure to the valve and fluid flow through the valve.

Other objects and advantages will be apparent from the following specification and the attached drawings in which:

Fig. 1 is a partial schematic of the control system for a hydromatic propeller showing a preferred embodiment of our valve.

Fig. 2 is a perspective showing, cut away, of our valve illustrating hydraulic fluid flow paths, the relationship between the valve sleeve and the movable valve piston and the fluid flow porting arrangement.

Figs. 3 and 4 are partial showings of the valve shown in Fig. 2 to show the movable piston at both end travel positions.

Figure 6:
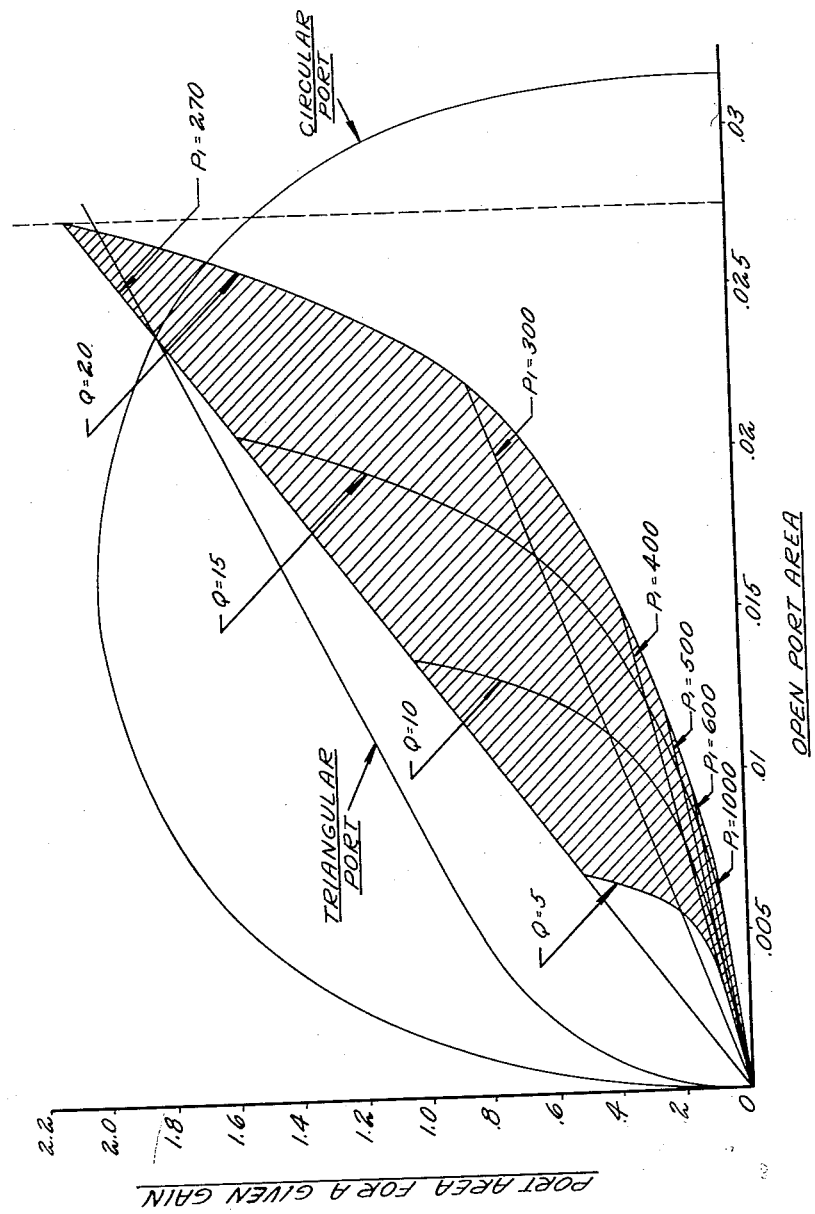

Fig. 5 is a schematic showing of a double-orifice hydraulic line, to illustrate the type of hydraulic flow encountered when our valve is pressure regulating with $A_1$ representing the pressure regulating aperture of Fig. 2 and $A_2$ representing the total clearance leakage areas which will cause uncontrolled pressure reduction of the controlled pressure $P_2$. This figure will be used to illustrate the mathematical method used to determine the shape of the pressure regulating port 100.

Fig. 6 is a graphic representation showing characteristics of a constant gain pressure regulating ideal port shape and includes graphs showing like characteristics of both triangular and circular ports or apertures superimposed thereon to illustrate the applicability of each.

Fig. 7 is an illustration of the optimum shape of a pressure regulating aperture.

Fig. 8 is an illustration of a triangular slot which approximates the optimum shape of a pressure regulating aperture.

The valve taught in this invention is shown in Fig. 1 and is designated as reference numeral 10. In the overall embodiment shown in Fig. 1, hydraulic fluid from sump 12 is passed through our pressure reducing and sequencing valve 10 and distributor valve 14 to the pitch change motor 16 to vary the blade angle of propeller blades 18. More particularly, fluid pump 20 pumps high pressure hydraulic fluid from sump 12 through by-pass valve 22 and filter 24 thence thru inlet line 23 to sequencing valve 10. One of the functions of valve 10 is to insure that hydraulic actuating fluid is provided thru controlled pressure outlet line 72 to propeller bearings (not shown), through line 26 to control unit 28, thru line 33 to preload piston 30 which performs the function of eliminating the play or backlash in connection 35 between control 28 and distributor valve 14 to insure accurate control positioning of the distributor valve, and thru line 31 to pitch lock 32, to disengage the pitch lock and permit propeller blade pitch change, before it is admitted to pitch change motor 16 thru distributor valve 14. Accordingly, until the pressure provided to the bearings, control 28, preload piston 30 and pitch lock 32 reaches a predetermined value, sequencing valve 10 blocks the passage of hydraulic fluid to distributor valve 14 thru line 25. Once this preselected bearing and control pressure is reached, the sequencing, pressure reducing, and pressure regulating valve 10 then performs the function of reducing the high pressure of the fluid from pump 20 by causing it to pass through restrictions and regulating the area of the restrictions to maintain a controlled pressure in line 72 which passes to the control 28, preload piston 30, pitch lock 32, while also permitting the flow of hydraulic actuating fluid to distributor valve 14 thru line 25. Distributor valve 14, which is positioned by pilot operated control 28 through connection 35 and feedback 29, determines whether pressurized hydraulic fluid which it receives from valve 10 thru line 25 is to be directed to the pitch change motor low pitch chamber 36 or to the pitch change motor high pitch chamber 38. The position of lands 40 and 42 of distributor valve 14 determine whether the pressurized fluid is to be directed through line 44 to chamber 36 to cause the blades 18 to rotate toward low pitch blade angle, at which time the fluid in chamber 38 is returned to sump 12 thru lines 46 and 48 or through line 46 to chamber 38 to rotate blades 18 toward high pitch blade angle at which time the pressurized fluid in chamber 36 drains through line 44, distributor valve internal passage 49, and line 48 to sump 12. Control 28 may be as disclosed in U.S. Patent No. 2,849,072 to Brahm wherein valve 42 corresponds to our valve 14 and is positioned by the unnumbered shaft carrying threads 38, which unnumbered shaft corresponds to our connection 35, and feedback 22 corresponds to our feedback 29, and wherein the lines connecting sump 62 and piston 58 corresponds to line 26 or as disclosed in U.S. Patent No. 2,850,103 wherein valve 72 corresponds to our valve 14 and is positioned in the fashion just described with respect to the Brahm patent as recited therein. Control 28 more particularly may be as disclosed in U.S. application Serial No. 508,882 filed May 17, 1955, now Patent No. 2,928,476, wherein our connection 35 would be driven by gear 122 and our pilot positioned lever 111 would position elements 40 through 78 thereof and line 26 corresponds to line 150. It will further be obvious to those skilled in the art that control 28 could well comprise a spool valve positioned by pilot lever 111 to direct actuation fluid from line 26 selectively to either side of a reciprocal piston which positions distributor valve 14 through connection 35.

Our sequencing, pressure reducing and pressure regulating valve 10 is shown more particularly in Fig. 2 and comprises valve stationary sleeve unit 50 which surrounds and envelops valve piston unit 52. Piston 52 is movable within the cylindrical chamber formed by sleeve unit 50 and is biased toward the left, as shown in Fig. 2, by the combined action of spring 54, which abuts against plate 56 of sleeve unit 50 and surface 58 of piston unit 52, and sump pressure from line 48.

As best shown in Fig. 2, piston unit 52 comprises central stem 51, internal passage 57 within stem 51, and end lands 53 and 55 and intermediate land or piston 60 projecting from stem 51. Lands 53, 55 and 60 are sized and shaped to engage sleeve 50 in slidable sealing relation and to form annuli therewith.

When piston unit 52 is in its far left position, land or piston 60 is in the position shown as 60' in Fig. 3, where it slidably engages the inner surface 62 of sleeve unit 50 in sealing fashion, thereby preventing fluid flow therebetween. With piston 60 in the Fig. 3 position, all of the hydraulic actuating fluid which is provided to valve 10 from a pressure source, such as pump 20 (Fig. 1), passes through inlet port 64 into annulus 66, then through opening 68 and through internal passage 57 of valve piston unit 52, through outlet aperture 71 (Fig. 2) and controlled pressure outlet line 72 from whence it is directed, as shown in Fig. 1, to the propeller bearings, the propeller control 28, the preload piston 30 and the pitch lock 32. When the pressure of the hydraulic fluid in controlled pressure chamber 74 reaches a predetermined value, its fluid force acting against the left end of valve piston unit 52, particularly on surfaces 76 and 78, will overcome the combined forces of spring 54 and any pressure, such as sump pressure, in cavity 80 acting on the right side of piston unit 52, thereby causing piston unit 52 to move toward the right. When piston unit 52 moves a sufficient distance to the right, see Fig. 2, land or piston 60 loses engagement with surface 62 of sleeve unit 50 and forms an aperture therebetween, such that the hydraulic fluid may now also pass from inlet line 23 through annulus 82 and thence through outlet aperture 84 to outlet line 25. When this occurs, valve unit 10 has completed its sequencing function and commences its pressure regulating function so as to control the pressure of the hydraulic actuating or controlled fluid in controlled pressure chamber 74 and being passed through controlled pressure outlet line 72 to the bearings, controls and the like, described supra. It should be noted before departing from the description of the sequencing function of valve unit 10 that piston or land 60 is provided with chamfered surface 90 (Fig. 2) on its left outer surface such that a smooth and gradual fluid flow is provided thru the port formed between chamfer 90 and sleeve unit 50 during the period of initial rightward movement of piston 60 from its fully biased position (60' of Fig. 3). Chamfered surface 90 provides smooth fluid flow, and prevents substantial pressure variations.

It will be noted that in the position shown in Fig. 2, piston 60 is so positioned that hydraulic actuating fluid from inlet passage 23 may flow to the left of piston 60 and thru line 25 to distributor valve 14 (Fig. 1), and may also flow to the right of piston 60 through pressure regulating aperture 100, formed between notch 102 in sleeve unit 50 and the skirt or right surface 104 of piston 60. Valve 10 is now performing a pressure regulating function by forming pressure regulating aperture 100 of such size that the regulated or controlled pressure within cavity 74 will remain substantially at a predetermined value. Should the controlled pressure in chamber 74 reach a value sufficiently great to compress spring 54, piston unit 52 will move to its far right (Fig. 4) position so as to eliminate pressure regulating aperture 100, thereby causing all hydraulic actuating fluid from inlet line 23 to pass through annulus 82, outlet aperture 84 and line 25 to distributor valve 14 while leakage in the system causes the controlled pressure in chamber 74 to reduce to a point where spring 54 will move valve 52 leftwardly to reestablish metering port 100. When the control pressure in chamber 74 drops below the preselected minimum limit, the force of spring 54 and the hydraulic fluid in cavity 80, acting upon the right side of piston unit 52, causes the piston to move to the left, thereby opening pressure regulating aperture 100 to permit hydraulic fluid to flow through hollow valve stem internal passage 57, thru outlet aperture 71 and into controlled pressure chamber 74, thereby increasing the controlled pressure to the selected value. Conversely, an increase in control pressure causes a movement of the piston 52 to the right.

It will be obvious that if piston unit 52 is highly sensitive to changes in the controlled pressure in chamber 74, it will move to change the size of pressure regulating aperture 100 too quickly and either cause a violet built-up or reduction of the controlled pressure, thereby causing piston unit 52 to oscillate rapidly and "chatter." This is obviously highly undesirable and it is equally undesirable to have the response of piston unit 52 sufficiently insensitive to changes in the controlled pressure in chamber 74 that piston unit 52 is sluggish in moving to correct controlled pressure error and thereby fails to fully correct the controlled pressure error in the desired time.

It is an important consideration of valve 10 that it be sufficiently sensitive to controlled pressure error, that it will quickly correct the error and yet not so sensitive that valve "chattering" will be encountered. An accepted measure of valve sensitivity is called "gain" and our valve is so constructed that the gain is maintained substantially constant or within preselected limits over wide ranges of fluid inlet pressure to valve 10 and rate of fluid flow variation thru valve 10.

Gain of a valve may be defined as the ratio of output-to-input. Assuming that we wish to have valve 10 perform the function of regulating the pressure in controlled pressure chamber 74 so as to be a controlled pressure of 220 p.s.i., we may define gain as the ratio of the final controlled pressure change caused in the controlled pressure chamber 74 by corrective movement of valve 10 to the initial controlled pressure change (error) in the controlled pressure chamber 74 which caused the corrective valve 10 shift. For example, if a 1 p.s.i. pressure rise above the preselected value of 220 p.s.i. occurs in the controlled pressure in chamber 74 and this 1 p.s.i. error causes a corrective valve shift which reduces said controlled pressure 100 p.s.i. to 121 p.s.i., then the gain will be 100; that is, the ratio of output-to-input, or correction-to-error, in this case 100/1. It is an important teaching of our invention to design the contour of aperture or port 100 such that both the controlled pressure and gain will be held constant or within preselected limits, irrespective of changes in supply pressure thru line 23 to the valve 10 and the rate of fluid flow through the valve 10.

Experience has shown that acceptable limits of gain in valves of this type are between 50 and 200 and preferably below 100. By way of example, we have chosen to maintain the controlled pressure in chamber 74 of valve 10 at 200 p.s.i., to consider rates of hydraulic or actuating fluid flow thru valve 10 to be between 5 to 20 quarts per minute, and to consider supply pressures to valve 10 thru line 23 to range from 270 to 1000 p.s.i.

Gain may also be expressed by the formula:

Equation I $$\text{Gain} = \frac{A_p}{K_s} \frac{\Delta P}{\Delta X_p}$$

where $A_p$ is the area of the valve acted on by the controlled pressure (220 p.s.i. and mainly surfaces 76 and 78, Fig. 2, in our example), $K_s$ is the spring constant for spring 54 (Fig. 2), $p$ is the final pressure change in controlled pressure in chamber 74, and $X_p$ is the movement of the valve piston unit 52 from its equilibrium position. Since reduction and/or elimination of valve chatter is a teaching of our invention, for purposes of description we will consider that the problem involved is to reduce gain but it should be borne in mind that in the case of sluggish valves, the problem involved would be to increase gain. From Equation I it will be noted that gain is dependent on three factors: (1) the area of the valve acted on by controlled pressure, (2) the spring constant, (3) the ratio of the final change in controlled pressure to the movement of the valve which produced this change. This latter factor, number (3), is determined by the valve porting or aperture arrangement. This latter factor was investigated since, once a porting arrangement is determined which will give good distribution of gain values for all flow and pressure conditions, the use of different biasing springs will permit varying these gain values. It is considered undesirable, for the purpose of gain increase, to reduce area $A_p$ or to increase spring constant $K_s$ for each would result in too little gain at the condition of low pressure supply and high flow rate. Further, increasing the spring constant would increase the spring error which may be defined as the difference between spring forces at the valve travel extremes, and this error is reflected in the controlled pressure.

In determining satisfactory port or aperture shape, Equation I was utilized, together with Equations II and III, given below, and using ordinates of "open port area" and "port area for given gain," which means the port area change necessary to attain a given gain, the graph shown in Fig. 6 was plotted to determine the characteristics of the ideal port shape, assuming a supply pressure range from line 23 from 270 to 1,000 p.s.i. and a metered flow range thru valve 10 from 5 to 20 quarts per minute. A gain of 50, and a 5 p.s.i. final pressure change, $\Delta_p$ of the Equation I, were chosen as optimum. Since the total fluid flow thru valve 10 during steady state operation is the flow thru aperture 100 plus the system leakage, Fig. 5 is shown to illustrate a simple hydraulic system representative of the valve 10 system. Equation II was used to determine areas $A_1$ and $A_2$ of the orifices shown in Fig. 5 for steady state conditions in which $A_1$ is the area of our pressure regulating oriffice 100 and $A_2$ is equal to the total clearance areas causing the leakage loss in our system, $P_1$ is supply pressure in line 23, $P_2$ is controlled pressure in chamber 74 and leakage pressure $P_3$, was presumed to be zero. The change in area $A_1$, regulating orifice 100, caused by movement of the valve 10 was added to the steady state $A_1$ and Equation III was used to determine the resulting controlled pressure $P_2$ in chamber 74. The gain was then calculated by Equation I. As used above, the term "total clearance areas" means the total of the unsealed areas thru and around the flow controlling parts in our system thru which fluid losses are encountered by way of fluid leakage. While this leakage is not desired, it occurs in most hydraulic systems because seals which are free of binding and high friction problems do not perform a perfect fluid sealing function.

By referring to the graph shown in Fig. 6, characteristics of the ideal pressure regulating port 100 shape affording constant gain or gain within preselected limits, irrespective of supply pressure and valve rate of flow, will be seen. It will be obvious, by observing the shaded area in Fig. 6, that the optimum shape of pressure regulating aperture 100 would be a variable geometry opening comprising a needle-point and flared skirt and designated as 100' in Fig. 7. If this is considered to be a difficult aperture to machine, it will be noted that a graph representing a triangular slot is also plotted on the Fig. 6 graph and that the results obtained from a triangular port nearly correspond to the optimum, Fig. 7 port shape results, varying therefrom mostly in the area of small port openings. Fig. 8 illustrates the V-shaped triangular pressure regulating orifice 100" and our experience has shown that the height "$h$" of said triangle should be substantially twice the width "$w$" thereof. It is interesting to note that the curve plotted on the Fig. 6 and designated circular port shows that a circular shaped port is totally unacceptable.

Equations II and III referred to above are:

(II) $$A = \frac{Q}{K\sqrt{\frac{g\Delta P}{\rho}}}$$

where A is the area of the orifice and/or aperture (whether $A_1$ or $A_2$ of Fig. 5), Q is the rate of fluid flow thru valve 10, K is a constant, $\Delta P$ is the pressure drop across the orifice ($A_1$ or $A_2$ of Fig. 5) and $\rho$ is the fluid density.

(III) $$\frac{P_2 - P_3}{P_1 - P_3} = \frac{1}{1 + (A_2/A_1)^2}$$

where $P_1$ is the supply pressure in line 23, $P_2$ is the controlled pressure in chamber 74, $P_3$ is leakage pressure, $A_1$ is the area of the pressure regulating aperture 100 and $A_2$ is symbolic of the system drainage clearances, as described in connection with Fig. 5.

While particular pressures and rates of flow have been chosen to illustrate a determination of port configuration, it should be borne in mind that the same method of approach may be used to determine optimum metering port shapes and sizes for any pressure and flow conditions and that such may be done without varying from the spirit or scope of our invention.

We claim:

1. In a fluid actuated control system for rotating the blades of an aircraft propeller, a hydraulic pitch change motor connected to rotate said blades and having a hydraulic piston-cylinder unit therein, a distributor valve to port hydraulic fluid to said motor, a propeller control to position said distributor valve, and a sequencing and pressure regulating valve operatively connected to said control and said distributor valve, spring means to bias said sequencing and pressure regulating valve to cause fluid to be transmitted to said control and to attain a preselected controlled fluid pressure in said control before fluid is transmitted to said distributor valve, said sequencing and pressure regulating valve comprising a sleeve, a piston movable within said sleeve and having a control stem with sleeve engaging lands at each of its ends and an intermediate land therebetween, said spring means biasing said piston in one direction, a passage in said piston stem communicating with the interior of said sleeve on the spring means side of said intermediate land and at the anti-spring means end of said piston to form a fluid outlet, a fluid inlet aperture in said sleeve engaging said intermediate land to form a pressure regulating aperture therewith, means to pass fluid through said pressure regulating aperture thence through said passage and said fluid outlet to establish a controlled fluid pressure downstream of said piston, said inlet aperture being so contoured to cooperate with said spring to maintain said preselected controlled fluid pressure in said control and also to maintain the ratio of final pressure change to initial error of said controlled fluid pressure within preselected limits irrespective of variations in supply pressure to the regulating valve and the rate of fluid flow through the regulating valve.

2. A valve comprising a substantially cylindrical sleeve unit, a movable piston unit slidably contained within said sleeve unit and having a stem with a passage extending throughout a portion of its length and a plurality of lands projecting from said stem and forming at least a first and second annulus with said sleeve unit and with one land located at each end of said piston unit, said passage opening at its first end into said sleeve unit at one end of said piston unit to form a first fluid outlet aperture and at its second end into one of said annuli, a fluid inlet aperture and a second fluid outlet aperture spaced therefrom in said sleeve unit, said inlet aperture comprising a main portion and a pressure regulating portion, means biasing said piston unit to a first end travel position in which an intermediate land blocks communication between said inlet and second outlet apertures while establishing communication between said inlet aperture and first outlet apertures, means to pass fluid through said inlet aperture thence through said first outlet aperture with said piston unit in said first end travel position thereby establishing a pressure chamber downstream of said first outlet aperture defined by said sleeve unit and said piston unit land adjacent said first outlet aperture so that when the pressure within said pressure chamber exceeds a preselected value a force is exerted upon said piston unit to overcome the force of said biasing means to cause said piston unit to move to its second end travel position in which said intermediate land blocks communication between said inlet and first outlet apertures while establishing communication between said inlet and second outlet apertures, and further so that when the pressure within said pressure chamber is reduced below said preselected value the force of said biasing means exceeds the force acting on said piston unit by the fluid within said pressure chamber thereby moving said piston unit toward said first end travel position to an intermediate position in which said intermediate land forms a pressure regulating aperture with the pressure regulating portion of said inlet aperture and places both of said outlet apertures into communication with said inlet aperture to increase the pressure in said pressure chamber to said preselected value, said pressure regulating portion and aperture being of such shape and area variation that both the preselected pressure in said pressure chamber and the ratio of the amount of correction-to-error thereof remains substantially constant or within preselected limits.

3. In a propeller having variable pitch blades, means for varying the pitch of said blades, means for controlling said pitch varying means including fluid operated mechanism, a fluid distributor valve controlled by said controlling means for directing fluid to said pitch varying means, a source of fluid under pressure, a regulating device hydraulically connected to said source and said distributor valve, said regulating device including a spring biased movable element for initially blocking the flow of fluid from said source to said distributor valve while porting the flow of fluid from said source to said fluid operated mechanism until the pressure therein reaches a predetermined value and then permitting the flow of fluid from said source to said distributor valve while maintaining the pressure in said fluid operated mechanism at said predetermined value.

4. In a propeller having variable pitch blades, means for varying the pitch of said blades, means for controlling said pitch varying means including fluid operated mechanism, a fluid distributor valve controlled by said controlling means for directing fluid to said pitch varying means, a source of fluid under pressure, a regulating device hydraulically connected to said source and said distributor valve, said regulating device including a spring biased movable element for initially blocking the flow of fluid from said source to said distributor valve while porting the flow of fluid from said source to said fluid operated mechanism until the pressure therein reaches a predetermined value, then permitting the flow of fluid from said source to said distributor valve while maintaining the pressure in said fluid operated mechanism at said predetermined value, and means in said regulating device for reducing chatter.

5. In a propeller having variable pitch blades, means for varying the pitch of said blades, means for controlling said pitch varying means including fluid operated mechanism, a fluid distributor valve controlled by said controlling means for directing fluid to said pitch varying means, a source of fluid under pressure, a regulating device hydraulically connected to said source and said distributor valve, said regulating device including a spring biased movable element for initially blocking the flow of fluid from said source to said distributor valve while porting the flow of fluid from said source to said fluid operated mechanism until the pressure therein reaches a predetermined value, then permitting the flow of fluid from said source to said distributor valve while maintaining the pressure in said fluid operated mechanism at said predetermined value, and a variable geometry opening in said regulating device, said opening being varied in response to movement of said movable element.

6. In a propeller having variable pitch blades, means for varying the pitch of said blades, means for controlling said pitch varying means including fluid operated mechanism, a fluid distributor valve controlled by said controlling means for directing fluid to said pitch varying means, a source of fluid under pressure, a regulating device hydraulically connected to said source and said distributor valve, said regulating device including a spring biased movable element for initially blocking the flow of fluid from said source to said distributor valve while porting the flow of fluid from said source to said fluid operated mechanism until the pressure therein reaches a predetermined value, then permitting the flow of fluid from said source to said distributor valve while maintaining the pressure in said fluid operated device at said predetermined value, and a V-shaped opening in said regulating device, said opening being varied in response to movement of said movable element.

7. A valve comprising a sleeve having a fluid inlet aperture therein, a piston movable within said sleeve and having a control stem with sleeve engaging lands at each of its ends and an intermediate land therebetween and having a first and second side engaging said fluid inlet aperture, a first fluid passage having a first inlet defined by said first side of said intermediate land and said fluid inlet aperture, a spring biasing said piston in one direction to block said first inlet, a second fluid passage comprising a passage in said piston stem communicating with the interior of said sleeve on the spring side of said intermediate land and at the anti-spring end of said piston to form a fluid outlet and including a second fluid inlet defined by said second side of said intermediate land and said fluid inlet aperture which coact to form a pressure regulating aperture, means to pass fluid through said pressure regulating aperture thence through said second fluid passage and said fluid outlet to establish a controlled pressure chamber downstream of said piston to coact with said spring to move said piston relative to said sleeve and said intermediate land relative to said fluid inlet aperture to regulate the areas of said first fluid inlet and said pressure regulating aperture, said pressure regulating aperture being so contoured to cooperate with said spring to maintain said controlled pressure constant in said pressure chamber and also to maintain the ratio of final pressure change to initial error of said controlled pressure within preselected limits irrespective of supply pressure value and the rate of fluid flow through the valve.

8. A valve comprising a sleeve having a fluid inlet aperture therein, a piston movable within said sleeve and having a control stem with sleeve engaging lands at each of its ends and an intermediate land therebetween and having a first and second side engaging said fluid inlet aperture, a first fluid passage having a first inlet defined by said first side of said intermediate land and said fluid inlet aperture, a spring biasing said piston in one direction to block said first inlet, a second fluid passage comprising a passage in said piston stem communicating with the interior of said sleeve on the spring side of said intermediate land and at the anti-spring end of said piston to form a fluid outlet and including a second fluid inlet defined by said second side of said intermediate land and said fluid inlet aperture which coact to form a pressure regulating aperture, means to pass fluid through said pressure regulating aperture thence through said second fluid passage and said fluid outlet to establish a controlled pressure chamber downstream of said piston to coact with said spring to move said piston relative to said sleeve and said intermediate land relative to said fluid inlet aperture to regulate the areas of said first fluid inlet and said pressure regulating aperture, said pressure regulating aperture being contoured V-shaped with apex toward said spring and cooperating with said spring to maintain said controlled pressure constant in said pressure chamber and also to maintain the ratio of final pressure change to initial error of said controlled pressure within preselected limits irrespective of supply pressure value and the rate of fluid flow through the valve.

9. Apparatus for combating chatter in a spring biased pressure regulating valve having a pressure regulating aperture to establish and maintain a controlled pressure constant including gain regulating means comprising means to match the area of said pressure regulating aperture to spring rate for the ranges of supply pressure and flow required in accordance with the formula gain equals the area of the valve acted on by the controlled pressure, times the first pressure change in controlled pressure, quantity divided by the spring rate times the amount of valve movement from equilibrium to effect said final pressure change.

References Cited in the file of this patent

UNITED STATES PATENTS

| | | |
|---|---|---|
| 2,496,577 | Cahill | Feb. 7, 1950 |
| 2,556,700 | Moore | June 12, 1951 |
| 2,687,743 | Huber | Aug. 31, 1954 |
| 2,703,138 | Pearl | Mar. 1, 1955 |